March 24, 1925.

I. CARLSON

TAPPING MACHINE

Filed March 23, 1921

1,530,980

Inventor
Ivac Carlson.
By Attorneys
Southgate & Southgate.

Patented Mar. 24, 1925.

1,530,980

UNITED STATES PATENT OFFICE.

IVAR CARLSON, OF LEOMINSTER, MASSACHUSETTS, ASSIGNOR, BY MESNE ASSIGNMENTS, TO THOMPSON-COPELAND COMPANY, OF WORCESTER, MASSACHUSETTS, A CORPORATION OF MASSACHUSETTS.

TAPPING MACHINE.

Application filed March 23, 1921. Serial No. 454,693.

*To all whom it may concern:*

Be it known that I, IVAR CARLSON, a subject of the King of Sweden, residing at Leominster, in the county of Worcester and State of Massachusetts, have invented a new and useful Tapping Machine, of which the following is a specification.

This invention relates to a machine for tapping nuts automatically. The principal objects of the invention are to provide a machine that can be controlled non-positively for continuously performing the tapping operation so as to reduce the breaking of the taps; to provide a construction which can be entirely enclosed, thus protecting it from dirt and injury and protecting the operator; and to provide an automatic machine in which the movements of the tap in the work will control its direction of rotation.

Reference is to be had to the accompanying drawings in which—

Figure 1:
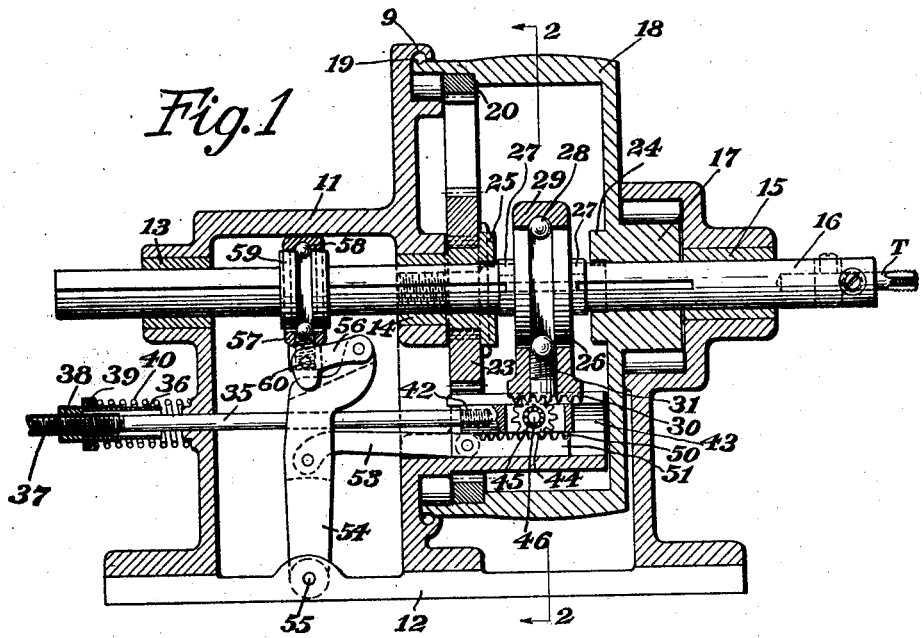
Figure 2:
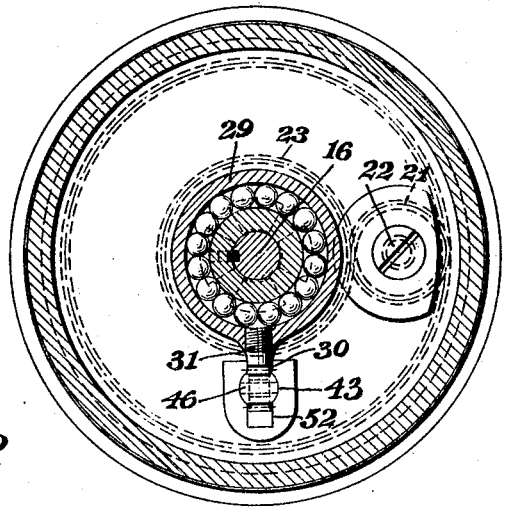

Fig. 1 is a longitudinal sectional view of a tapping machine constructed in accordance with this invention; and Fig. 2 is a sectional view on the line 2—2 of Fig. 1.

I have shown the invention as mounted in a self containing frame 11 on a base 12. The frame is provided with three bearings for bushings 13, 14 and 15 designed to hold the operating spindle 16. On this spindle inside the machine is journalled a hub 17 constituting an integral part of a pulley 18 receiving power constantly from a driving belt. The free edge of the pulley 18 is provided with a circular groove 19 located inside a circular groove 9 in a flange on the frame 11. This is provided for protection against escape of lubricating oil with which the interior is supplied. This pulley is not keyed to the shaft 16 but is mounted to rotate thereon. It is provided with an internal gear 20 which meshes with a gear or pinion 21 located on a shaft 22 mounted on the frame 11 at one side of the center. This gear in turn meshes with a gear 23 concentric with the shaft 16. The pulley 18 is shown as having a side flange connecting its hub with the pulley proper which constitutes an enclosing member for some of the mechanism inside.

On the inner end of the hub of this pulley are clutch teeth 24 and on the hub of the gear 23 are opposite clutch teeth 25. Slidingly keyed on the shaft 16 is a clutch 26 having teeth 27 on its opposite faces for meshing with either set of clutch teeth 24 or 25 according to the position of this clutch member 26. This clutch is shown as supported by bearing balls 28 in a ball race constituting a groove in the interior of a hub 29. This hub 29 therefore is capable of moving longitudinally of the shaft 16. It is provided with a downwardly extending portion at the center having a rack 30 on the bottom. I have also shown in the middle of this rack a perforation screw threaded inside for receiving a screw 31 having a notched end. It will be obvious that the sliding of the hub 29 back and forth will connect the shaft 16 either directly with the pulley 18 or indirectly with it through the speeding up gears 23 and 21. In the first case, the shaft 16 will be rotated positively in the same direction as the pulley 18 and at the same speed, and in the other case, it will be rotated in the opposite direction and at high speed. It will be seen, therefore, that the shaft 16 can be rotated in either direction according to the position of the clutch 26.

For the purpose of controlling the clutch I have provided an operating rod 35. This is intended to be operated automatically by machinery that I have not shown herein, but can be operated by hand if desired. Then it is shown as extending outside the frame or casing 11. It is provided with a screw threaded portion 37 for adjustment. This is adjustably connected with a thimble 38 having a hollow sleeve 36 and a collar 39 on it. These can be adjusted to increase or decrease the compression of a spring 40 which bears on the underside of the collar 39 at one end and on the frame 11 at the other end. The sleeve is adapted to engage the frame and limit the inward motion of the rod.

The rod 35 screws at its other end into a sliding block 42. This block is mounted in ways 43 on the frame and is provided with a pinion 44 mounted by ball bearings 45 on a transverse rod 46 which the slide 42 carries. This pinion 44 meshes with the rack 30 on the sliding clutch member 29 at the top. It also meshes with a rack 50 at the bottom which is mounted on a slide 51 carried in stationary ways 52 by the frame 11.

This rack 50 is provided with an arm 53 pivoted to a lever 54 which, in turn, is pivoted at a point 55 on the base 12 of the machine. This lever 54 extends upwardly from its point of pivotal support 55 and at its upper end, and beyond the point at which the arm 53 is connected with it, it is pivotally connected with a link 56. This link is pivoted to a collar 57 located practically in alignment with the lever 54 for carrying bearing balls 58 which support a ring 59 that is pinned to the shaft 16. A pin 60 is employed for connecting the pivotal end of the link 56 with the ring 57.

The operation is as follows:

With the parts in the position illustrated and a tap T fixed in the end of the shaft 16, the machine is started by pushing in on the rod 35 either by hand or by some operating machine part. The gear 44 moves straight in without turning because if it started to roll on the rack 50 it would tend to push ahead the rack 30 twice as fast. This would move the spindle 16 and ring 59 at the same rate and therefore swing the lever 54 and move the rack 50 and vice versa. It carries both racks 30 and 50 with it until it comes about to central position, that is a position in alignment with the center of the pulley 18. During this motion the rack 30, moving to the right, causes the clutch teeth 27 to engage the teeth 24 and the shaft therefore to be rotated directly by the pulley 18. The shaft 16 has already moved to the right with the rack 50 and the tap has engaged the work. The tap then feeds into the work which is held stationary. The rotating tap after starting into the work will be fed forward by its rotation therein which positively causes the shaft 16 to advance further. As it advances the collar 57 goes with it and consequently the lever 54 swings further to the right. This moves the rack 51 to the right until the thimble 38 strikes the frame, and rotates the pinion 44. This moves the rack 30 to the left, disengages the clutch from the teeth 24 and finally the expansion of the spring 40 moves the two racks 50 and 30 together to the left and brings the clutch 26 over to the left to engage the teeth 25. This rotates the shaft rapidly in the opposite direction and quickly withdraws the tap. But in the meantime the collar 57 has moved to the left beyond the position shown and the lever 54 also. This draws the rack 50 to the left and rotates the pinion 44 on a stationary axis. In the form shown it does not move far enough to withdraw the clutch from engagement with the teeth 25. This leaves the machine running in the reverse direction. If the clutch teeth were short enough and the withdrawing motion were long enough it would stop the machine in the position shown unless the rod 35 were pushed in again which is done to repeat the operation. During this change the nut can be removed and replaced by a new blank.

In this way, a very simple automatic arrangement is provided in which the tap will not be broken if it does not register with a nut. The operator is not in constant attendance at the machine if an automatic starting means is employed and a usual automatic nut feed. The machine is intended to be a part of an entirely automatic installation.

Although I have described and illustrated only a single form of the invention I am aware of the fact that modifications can be made therein by any person skilled in the art without departing from the scope of the invention as expressed in the claims. Therefore, I do not wish to be limited to all the details of construction, but what I do claim is:—

1. In a machine of the character described, the combination of a frame, a movable working shaft journalled thereon, a pulley rotatably mounted on said shaft having a set of clutch teeth, a train of gearing connected with the pulley comprising a gear rotatably mounted on the shaft and rotatable by said pulley in the opposite direction and having clutch teeth, a clutch movable along the shaft and splined thereto and adapted to engage either set of clutch teeth to drive the shaft in either direction, and means movable with the shaft whereby the clutch will be caused to move in the direction to disconnect the clutch from the part that is driving the shaft and connect it with the other rotary element on the shaft.

2. In a machine of the character described, the combination of an enclosed casing, a working shaft journalled thereon, a pulley rotatably mounted on said shaft having a set of clutch teeth, a train of gearing connected with the pulley comprising a gear rotatably mounted on the shaft and rotatable by said pulley in the opposite direction and having clutch teeth, a clutch movable along the shaft and splined thereto and adapted to engage either set of clutch teeth to drive the shaft in either direction, a collar rotatably fixed to the shaft and movable therewith longitudinally, a lever connected with said collar to be moved thereby, a reciprocatory element connected with the lever and movable thereby, and means whereby when the reciprocatory element moves in one direction the clutch will be caused to move in the opposite direction to disconnect the clutch from the part that is driving the shaft and connect it with the other rotary element on the shaft.

3. In a tapping machine, the combination of a casing, a tapping shaft journalled thereon, a pulley rotatably mounted on said shaft having a set of clutch teeth, a train of gearing connected with the pulley comprising a gear rotatably mounted on the shaft and rotatable about said gearing in the opposite direction, and having clutch teeth, a clutch movable along the shaft and splined thereto and adapted to engage either set of clutch teeth to drive the shaft in either direction, a collar movable with the shaft, and means for moving the clutch in one direction from the collar when the collar moves in the opposite direction, whereby the feed of the shaft due to the travel of the tap in the hole being tapped will result in unclutching the part that is driving the shaft.

4. In a machine of the character described, the combination of an enclosed casing, a working shaft journalled thereon, a pulley rotatably mounted on said shaft and constituting means for closing the casing and enclosing the interior parts therein and protecting them, said pulley having a set of clutch teeth, a train of gearing connected with the inside of the pulley comprising a gear rotatably mounted on the shaft and rotatable by said pulley at a higher speed than the pulley and in the opposite direction and having clutch teeth, a clutch inside the pulley movable along the shaft and splined thereto and adapted to engage either set of clutch teeth to drive the shaft in either direction, a collar rotatably fixed to the shaft and movable therewith longitudinally, a lever connected with said collar to be moved thereby, a reciprocatory element connected with the lever and movable thereby, and means whereby when the reciprocatory element moves in one direction the clutch will be caused to move in the opposite direction to disconnect the clutch from the part that is driving the shaft and connect it with the other rotary element on the shaft.

5. In a machine of the character described, the combination of an enclosed casing, a working shaft journalled thereon, a pulley rotatably mounted on said shaft and constituting means for closing the casing and enclosing the interior parts therein and protecting them, said pulley having a set of clutch teeth, a train of gearing connected with the inside of the pulley comprising a gear rotatably mounted on the shaft and rotatable by said pulley at a higher speed than the pulley and in the opposite direction and having clutch teeth, a clutch inside the pulley movable along the shaft and splined thereto and adapted to engage either set of clutch teeth to drive the shaft in either direction, and means whereby the clutch will be caused to move in the direction to disconnect the clutch from the part that is driving the shaft and connect it with the other rotary element on the shaft.

6. In a machine of the character described, the combination of a frame, a shaft thereon adapted to support a tool on the end, a driving member rotatable on the shaft and having clutch teeth, a gear rotatably mounted on the shaft and having opposite clutch teeth, means for driving the gear from said driving member, a clutch slidably splined to the shaft for connecting the shaft either with the driving member or the gear, a lever connected with the shaft so as to swing therewith, a rack connected with the lever to be moved thereby and slidable in a direction parallel with the axis of the shaft, a pinion meshing with said rack, and a rack on the clutch facing oppositely to the first rack and meshing with the other side of said pinion.

7. In a tapping machine, the combination of a shaft adapted to support a tap on the end, a pulley rotatable on the shaft and having clutch teeth, a gear rotatably mounted on the shaft and having opposite clutch teeth, means for driving the gear from the pulley in the opposite direction, a clutch slidably splined to the shaft for connecting the shaft either with the pulley or the gear, a collar mounted on the shaft and movable longitudinally therewith, a lever connected with the collar at one end so as to swing therewith, a rack connected with the lever to be moved thereby and slidable in a direction parallel with the axis of the shaft, a pinion meshing with said rack, and a rack on the clutch facing oppositely to the first rack and meshing with the other side of said pinion, whereby when the shaft is fed inwardly owing to the engagement of the tap with the work, the first named rack will be forced in the same direction and will move the second rack and the clutch in the opposite direction and disconnect the driving pulley from the shaft and immediately thereafter connect the gear with the shaft to rotate the shaft in the opposite direction, and whereby when the shaft moves backwardly owing to the feed thereof caused by the withdrawal of the tap from the threaded work, the clutch will then be moved by the racks in the opposite direction.

8. In a machine of the character described, the combination of a frame, a shaft thereon adapted to support a tool on the end, a driving member rotatable on the shaft and having clutch teeth, a gear rotatably mounted on the shaft and having opposite clutch teeth, means for driving the gear from said driving member at a higher rate of speed, a clutch slidably splined to the shaft for connecting the shaft either with the driving member or the gear, a lever connected with the shaft so as to swing therewith, a rack connected with the lever to be moved thereby and slidable in a direction parallel with the axis of the shaft, a pinion meshing with said rack, a rack on the clutch facing oppositely to the first rack and meshing with the other side of said pinion, and a support for the pinion movable parallel with the shaft.

9. In a machine of the character described, the combination of a shaft for the tool, driving means mounted on the shaft, means connected with the shaft for automatically operating the driving means to connect the shaft up automatically to rotate first in one direction and then in the other, a controlling device therefor comprising a pinion, two opposite racks, one connected with the driving means and the other with the shaft, said racks meshing with opposite sides of said pinion, and means for reciprocating said pinion bodily and thereby moving both racks in the same direction to start or stop the machine.

10. In a machine of the character described, the combination of a shaft for carrying a tool, said shaft being mounted to rotate and reciprocate, a clutch for connecting said shaft with a source of power to drive it in either direction, said clutch having a rack, a sliding block, a pinion journalled on said sliding block and meshing with the rack, a second rack meshing with the pinion, means connected with the shaft for moving the second rack with the shaft, a controlling rod connected to said block for moving it thereby, for moving the pinion and both racks bodily in the same direction and moving the shaft and clutch with them.

11. In a machine of the character described, the combination of a shaft for carrying a tool, said shaft being mounted to rotate and reciprocate, a clutch for connecting said shaft with a source of power to drive it in either direction, said clutch having a rack, a sliding block, a pinion journalled on said sliding block and meshing with the rack, a second rack oppositely located meshing with the pinion, means connected with the shaft for moving the second rack in accordance with the longitudinal motions of the shaft, a controlling rod connected to said block for moving it thereby for moving the pinion and both racks bodily in the same direction and moving the shaft and clutch with them, means for limiting the motion of said rod in one direction, and yielding means for forcing it in the opposite direction to a limited distance.

12. In a machine of the character described, the combination with a shaft for carrying the operating tool, of a clutch for driving the shaft in either direction comprising a movable member having a rack, a pinion meshing with the rack, a second rack meshing with the opposite side of the pinion, a slidable block on which said pinion is mounted, whereby both racks will move with the block, and means for connecting the second rack with the shaft to cause them to move together.

13. In a tapping machine, the combination of a frame having three bearings in alignment, and provided with a flange extending outwardly, said flange being spaced from one end of one bearing, a driving pulley located on the shaft in said space and filling it, said pulley having a circumferential groove around one edge at a distance from the driving surface of the pulley and said flange having a groove overlapping the first named groove to receive oil thrown off therefrom and return it to the interior of the pulley by drainage, and means located within said pulley and flange for rotating the shaft from the pulley in either direction.

14. In a tapping machine, the combination of a spindle for carrying the tap freely movable longitudinally in its bearings, a driving member, a longitudinally movable clutch for connecting the driving member with the spindle to rotate it in either direction, a starting rod, and means connected with the starting rod for moving the spindle longitudinally therewith and also moving the clutch into position to drive the spindle in a forward direction after the spindle has started to move forward.

15. In a machine of the class described, the combination with a rotary spindle for carrying a tap, of means for mounting said spindle slidably so that it can feed forward at any rate according to the rate of feed of the tap into the work, means for causing reversal of direction of rotation of said spindle comprising a double clutch, an arm movable with the spindle for moving said clutch in the opposite direction, and a lever connected with the spindle and arm so as to be actuated by the feed of the spindle by the tap forward into the work to reverse the spindle.

16. In a machine of the class described, the combination with a freely slidable rotary spindle for carrying a tap, of a clutch for connecting the spindle with a source of power to rotate the spindle in either direction, and a lever connected at one end to the spindle to move longitudinally with it, as the spindle is moved by the rotation of the tap in the work, and means connected with and operated by said lever and movable parallel with the spindle and in the same direction for disconnecting the clutch and stopping the forward rotation of the spindle and feed of the tap into the work.

In testimony whereof I have hereunto affixed my signature.

IVAR CARLSON.